Aug. 23, 1960 O. W. BOUGHTON ET AL 2,949,814
SLIDE PROJECTOR
Filed Feb. 18, 1957 5 Sheets-Sheet 1

OLIN W. BOUGHTON
CHARLES J. DeGRAVE JR
KENNETH D. MAIER
INVENTORS

BY
*[signatures]*
ATTORNEYS

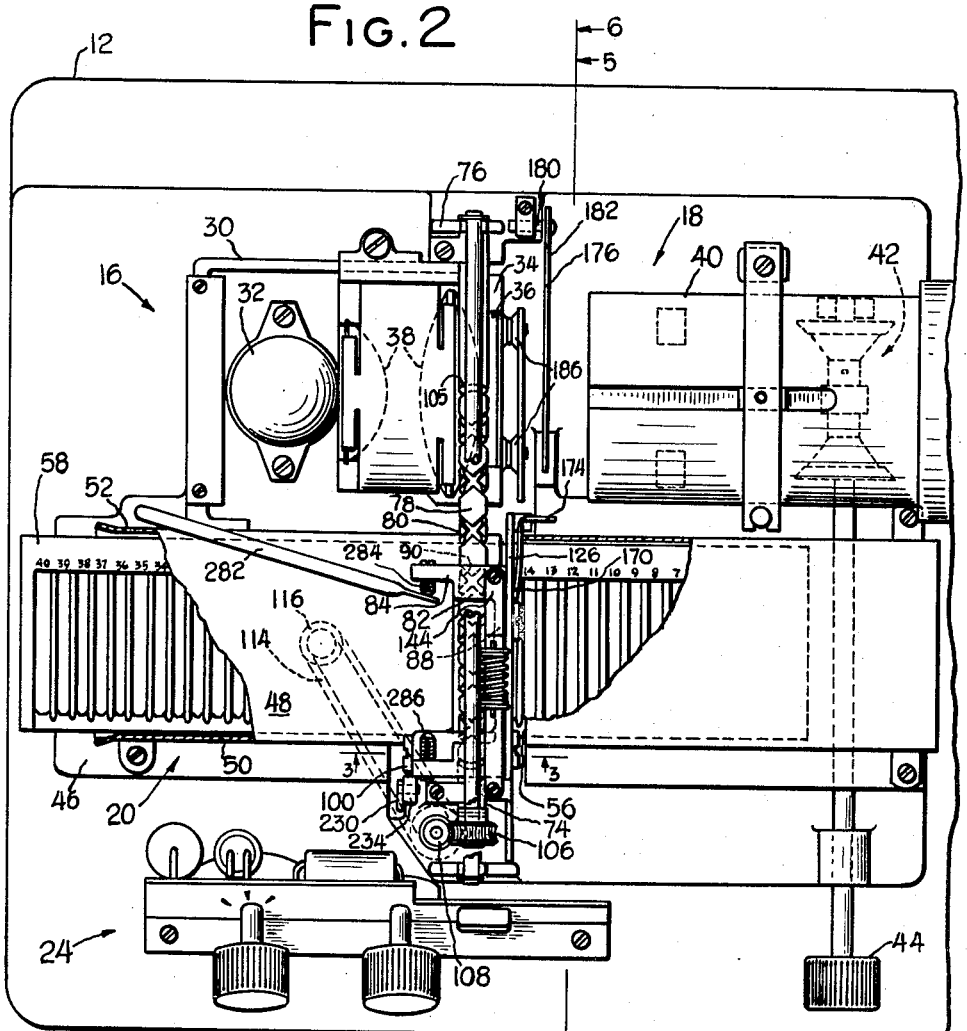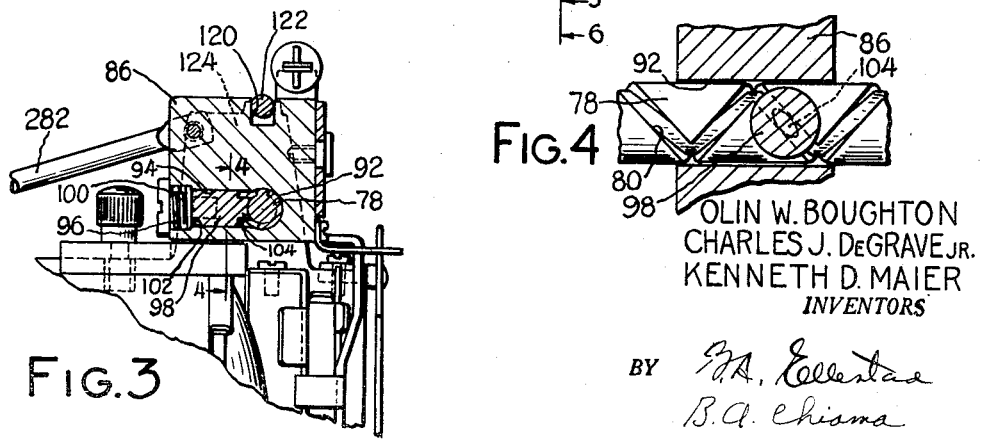

Aug. 23, 1960 O. W. BOUGHTON ET AL 2,949,814
SLIDE PROJECTOR
Filed Feb. 18, 1957 5 Sheets-Sheet 3

OLIN W. BOUGHTON
CHARLES J. DeGRAVE JR.
KENNETH D. MAIER
INVENTORS

BY *M. Ellestad*
*B. A. Chioma*
ATTORNEYS

Aug. 23, 1960
O. W. BOUGHTON ET AL
2,949,814
SLIDE PROJECTOR
Filed Feb. 18, 1957
5 Sheets-Sheet 4
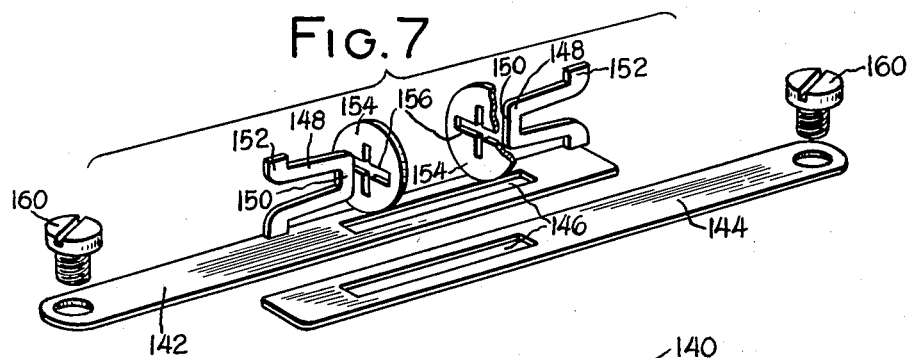
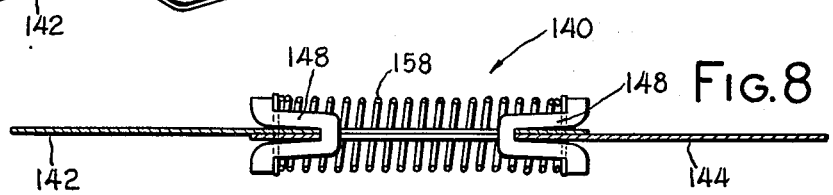
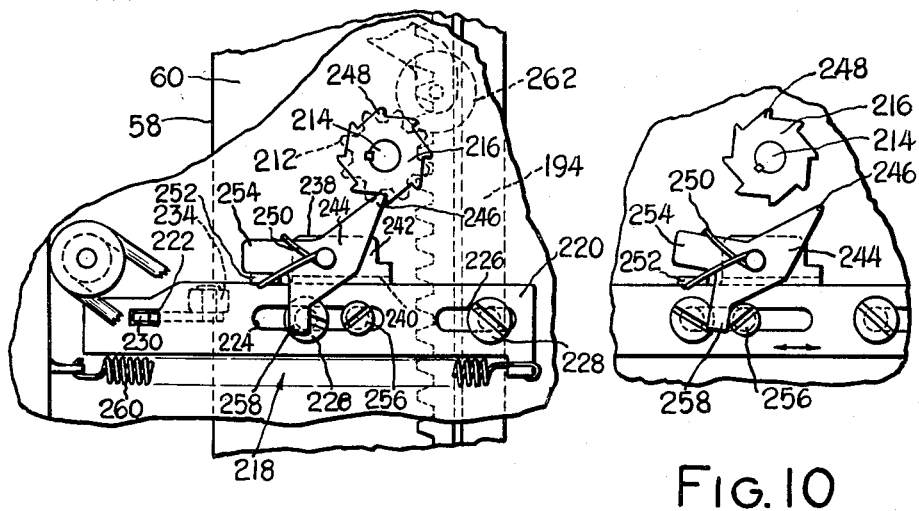
OLIN W. BOUGHTON
CHARLES J. DeGRAVE JR.
KENNETH D. MAIER
*INVENTORS*
BY *G.A. Ellestad*
*B.G. Chiama*
*ATTORNEYS*

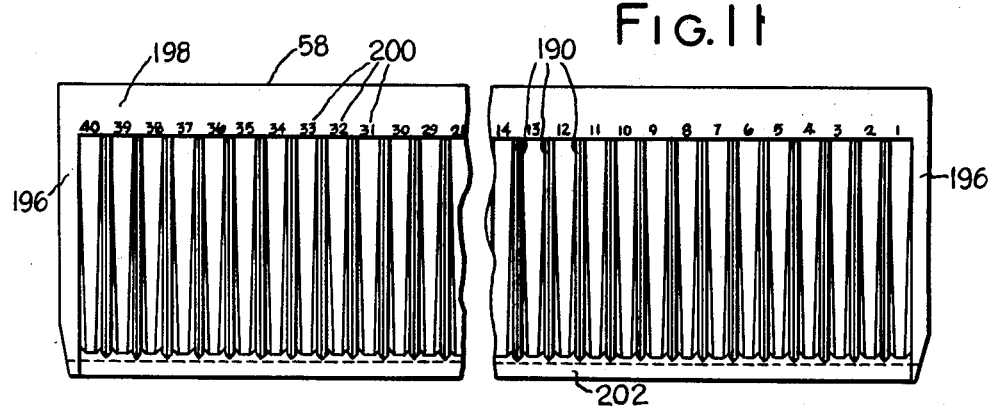
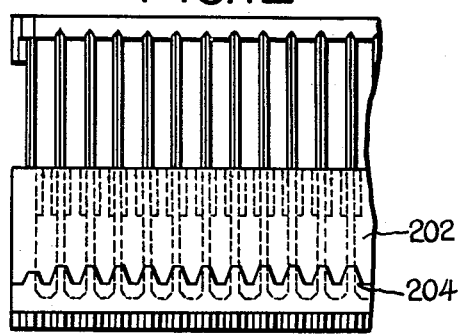
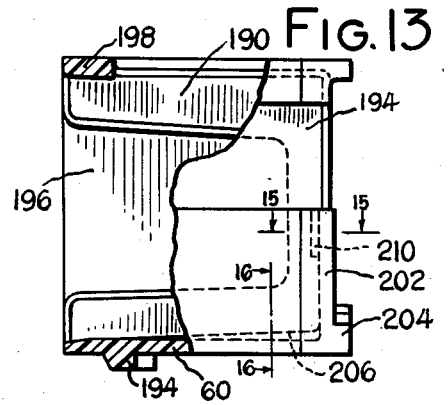
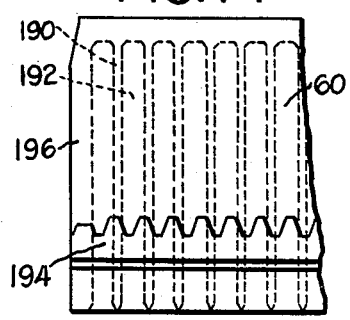
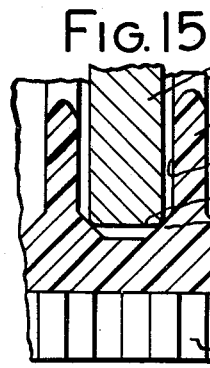
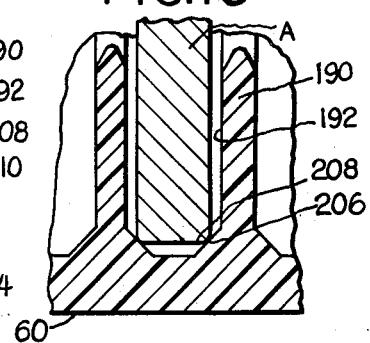

United States Patent Office 2,949,814
Patented Aug. 23, 1960

2,949,814

SLIDE PROJECTOR

Olin W. Boughton, Canandaigua, Charles J. De Grave, Jr., Chili, and Kenneth D. Maier, Mendon, N.Y., assignors to Bausch & Lomb Optical Company, Rochester, N.Y., a corporation of New York Filed Feb. 18, 1957, Ser. No. 640,710

7 Claims. (Cl. 88—28)

The present invention relates to projection apparatus and, more particularly, to a slide projector for projecting transparencies such as slides.

In recent years, the beauties and advantages of color transparencies have caught the public fancy and this has resulted in the tremendous expansion of those industries which manufacture cameras, slide projectors and related accessories. Most recently in this development has been the advent of automatic slide projectors which are designed to project a relatively large number of slides automatically and in a timed sequence without interference or additional manipulations from an attendant. Thus, home projection of slide transparencies has become more enjoyable since even the operator may relax and enjoy the projected views of his treasured slides without the need for continuously loading and projecting the slides individually.

Generally, the automatic slide projectors include a number of integrated mechanisms which cooperate to perform the desired result of automatic projection. Most notable of these is the slide pickup and return mechanism, the control for the timed projection, the slide tray or magazine, automatic feeding of the slide tray, and control switches for protecting the various mechanisms against careless operation. The present invention contemplates an improvement in each of the above features except the electrical circuit which is disclosed and claimed in the copending application for United States Letters Patent, Serial No. 640,905, filed February 18, 1957, and assigned to the same assignee. Therefore, it is the principal object of the present invention to provide an improved automatic slide projector embodying various improved features inherent therein.

Another object of the present invention is to provide a single unified and compact structure which is adapted to receive a slide tray carrying a relatively large number of transparencies and individually remove each of the transparencies from the slide tray, project the transparency, return it to its former position in the tray and advance the tray for another cycle of projection.

Still another object of the present invention is to provide an improved slide projector which may perform the operations in the last-mentioned object of the invention semi-automatically or automatically.

Further objects and advantages will be apparent to those skilled in the art by reference to the following specification and accompanying drawing wherein:

Fig. 2 is a plan view of the projector of Fig. 1 with some parts broken away and the cover removed;

Fig. 3 is a fragmentary sectional view of the carriage taken on the line 3—3 in Fig. 2;

Fig. 4 is a fragmentary sectional view taken on the line 4—4 in Fig. 3;

Fig. 7 is an enlarged perspective view of the override mechanism for the pickup and return mechanism;

Fig. 8 is a plan view in section of the override mechanism shown in Fig. 7;

Fig. 9 is a fragmentary plan view of the slide tray-advancing mechanism showing the toothed wheel and pawl in one position of operation;

Fig. 10 is a view of some of the parts of Fig. 9 but showing the pawl in another position of operation;

Fig. 11 is a plan view of the slide tray of the present invention;

Fig. 12 is an elevation of one end portion of the slide tray;

Fig. 13 is an end view of the tray with parts broken away;

Fig. 14 is a bottom view of the portion of the slide tray shown in Fig. 12;

Figure 17:
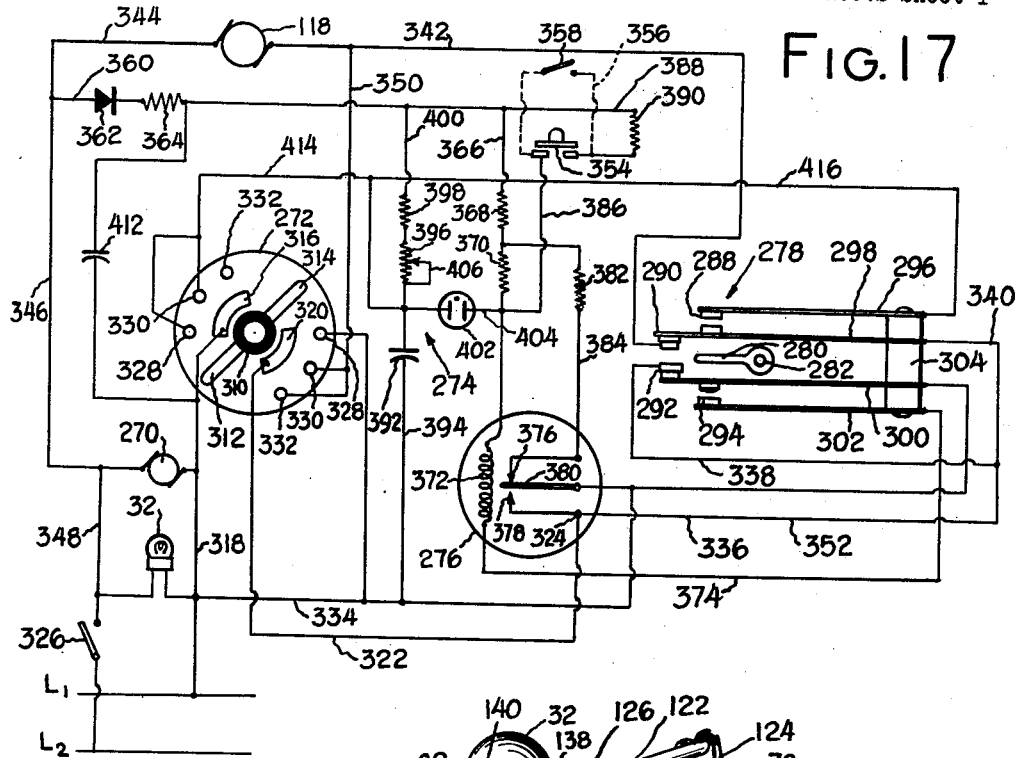

Figs. 15 and 16 are fragmentary sectional views taken on lines 15—15 and 16—16, respectively, in Fig. 13 and showing a portion of a slide transparency in position with respect to the confining walls of the slide tray; and Fig. 17 is a diagram showing the various electrical circuits utilized in the present invention.

Figure 1:
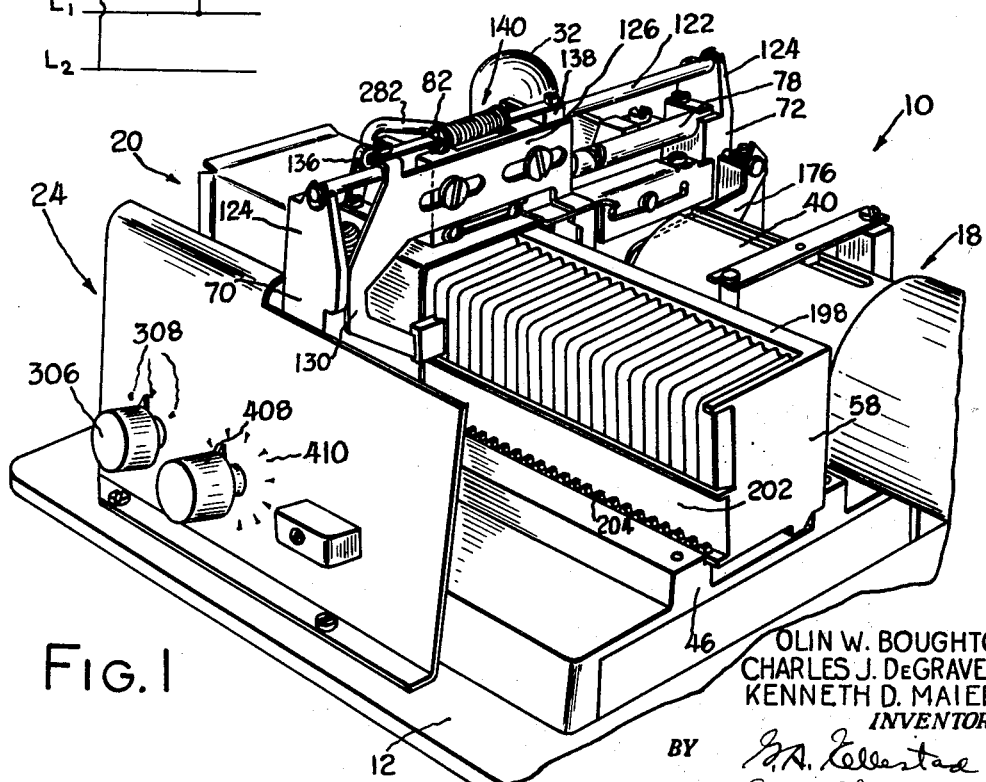
Fig. 1 is a perspective view of a slide projector embodying the invention with the casing or cover and portions of the magazine tray holder removed.

Referring to the drawings and more particularly to Figs. 1 and 2, there is shown a slide projector designated generally by the reference numeral 10 having a base 12 for mounting a suitable decorative cabinet (not shown) and for housing the various mechanisms of the present invention. Arranged on the base 12 is a conventional light source 16, a projection system 18, a slide tray holder 20, a slide pickup and return mechanism 22 and a control panel 24 for supporting various electrical control devices.

Referring now to Figs. 2–9 for a more detailed description of the various mechanisms of the present invention, the light source 16 is shown as including a housing or shield 30 which is suitably mounted on or integral with the base 12 and serves to protect a conventional projector lamp 32. The housing 30 has a front wall 34 which is provided with an aperture 36 through which light is projected from the lamp 32 by a system of condensing lenses 38 mounted in a cell attached to the wall 34. In axial alignment with the lamp 32 and the condensing lenses 38 is a focusing lens shown in Fig. 2 as housed in a cylindrical member 40 which together with the condensing lenses 38 comprise the optical system 18. A focusing mechanism, generally indicated by the reference numeral 42, is utilized to move the projection lens member 40 toward and away from the condensing lenses 38. Further description of the focusing mechanism is unnecessary since its operation will become immediately apparent to those skilled in the art. A knob 44 is associated with the focusing mechanism 42 and may be manipulated manually in order to effect axial movement of the member 40 for focusing purposes.

Figure 5:
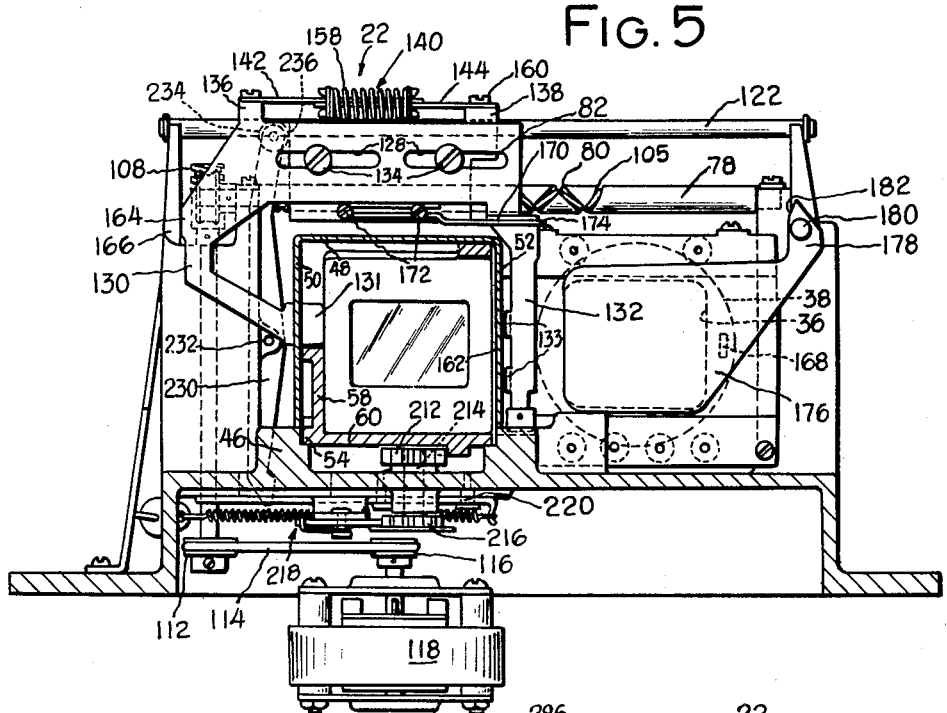
Fig. 5 is a sectional view taken on the line 5—5 in Fig. 2 showing the slide pickup and return mechanism in position to pick up a slide from the slide tray.
Figure 6:
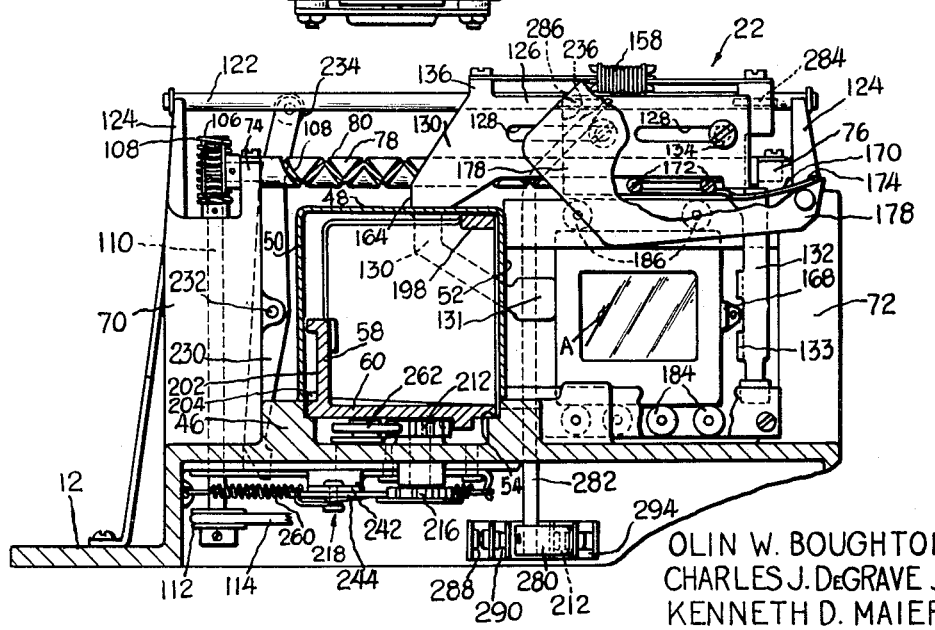
Fig. 6 is a sectional view similar to Fig. 5 but showing the pickup and return mechanism in another position.

As noted in Fig. 2, the axis of the projection system comprising the lamp 32, the lenses 38 and the projection tube 40 is slightly offset with respect to the center line of the base 12 in order to accommodate a tray holder. Immediately adjacent to the projection system and having its axis parallel with the axis of the projection system is the slide tray holder 20 which is suitably mounted on a slide bed 46 which in turn may be secured to the base 12 or be made integral therewith. As shown in Figs. 2, 5 and 6, the tray holder is formed as an integral three-sided longitudinally extending box having a top 48 and two sides 50, 52. The lower edges of the sides 50, 52 are adapted to rest upon shoulders 54 formed on the bed 46 and are secured to these shoulders by any suitable means. Actually, the holder 20 comprises two identical box-like structures in axial alignment and provided with an open area or slot between adjacent ends for permitting egress and ingress of transparencies. This is seen in Fig. 2, where a slot 56 is located intermediate the ends of the holder 20. For purpose of this invention and further description thereof, the holder 20 is considered to be a unitary structure formed with a slot intermediate its ends.

The slide tray holder is designed to slidably support a slide tray 58 which may be inserted at one end of the holder 20 (left end as viewed in Fig. 2) and drawn out at the other end. The slide tray 58 includes a flat bottom support plate 60 which rests upon the shoulders 54 and is guided therealong during the advancing stages of the tray. See Figs. 5 and 6. Advancing mechanism for moving the tray through the holder in a step-by-step fashion will be described hereinafter.

The slide pickup and return mechanism 22 comprising a carriage and a slide transfer device will now be described in detail. Mounted adjacent to the opposing sides of the base 12 and in a transverse plane with respect to the axis of the tray holder 20 is a pair of uprights 70, 72 which serve to support the mechanism 22 above the base 12. Each of the uprights 70, 72 is provided with bearings 74, 76, respectively, for rotatably supporting a reverse-helical groove drive shaft 78 which is provided with a groove 80 formed by two helices of equal pitch running in opposite directions and joined at their ends.

A U-shaped carriage 82 having its leg portions in the form of spaced blocks 84, 86 and a bight portion 88 integrally connected therebetween is rotatably supported by the drive shaft 78 by means of axially aligned openings 90, 92 formed in the blocks 84, 86, respectively, for receiving the shaft 78.

Movement of the carriage 82 axially along the shaft 78 in either direction by unidirectional rotation of the shaft is effected by the use of a cam follower carried by the carriage 82 and adapted to ride in the groove 80. As shown in Figs. 3 and 4, the block 86 is provided with a transverse bore 94 which opens into the opening and a tapped counterbore 96. A guidepin 98 is slidably retained in the bore 94 and a screw 100 is threadedly secured within the counterbore 96 in abutment against the pin 98 for preventing accidental removal of the latter from the bore and for another purpose which will presently appear. As shown in Figs. 3 and 4, the guide pin 98 is formed at one end with an annular surface 102 adjacent the end of the screw 100 and at the other end with a reduced portion 104 which is adapted to ride in the groove 80. The cam portion 104 is oval shape in cross-section and has a width slightly smaller than the width of the groove 80 for facilitating easy travel of the portion 104 along the walls of the groove. It will be noted that the oval-shape character of the portion 104 permits point contact thereof with the sides of the groove thereby reducing the friction therebetween to a minimum. The portion 104 is held in the groove by the abutment of the adjacent ends of the screw 100 and the pin 98 and it will be readily understood that the annular surface 102 serves as a bearing against the screw 100 permitting limited rotation of the pin within the bore 94.

As previously stated and as seen in Figs. 2, 5 and 6, the two helices of the groove 80 are joined at their ends. However, the extreme end portions 105 of the helices, for approximately 180° of turn of the shaft 78, are arcuately shaped and extend a distance equal to approximately one quarter of the lead of the groove 80. These end portions blend together to form a continuous curve thereby permitting a smooth reversal of direction during movement of the carriage 82. It will be apparent that as the drive shaft 78 is rotated, the pin 102 will be moved along the groove and will motivate the carriage 82 axially along the shaft 78 until the cam portion 104 of the pin reaches the extreme end of the helix in which it is traveling whereupon the cam 104 will be reversed in movement as will the carriage 82. It will be appreciated that the speed of travel of the carriage 82 is constant for nearly the full length of the helical groove, and that the presence of the curved portions of the helices at the ends thereof and for the distance mentioned above results in a slow down of the speed of the carriage in any one direction before reversal of the direction of its movement. Consequently, the carriage 82 is prevented from being thrown at the end of its travel in the direction in which it is moving before reversal. In this way, the inertial stresses on the groove 80, the portions 102 and the bearings 74, 76 for the shaft 78 are minimized.

The shaft 78 also carries at one end thereof, adjacent the bearing 74, a pinion 106 which is in mesh with a worm gear 108. The worm gear 108 is secured to one end of a drive shaft 110 which extends vertically downwardly through a suitable opening in the base 12. A tooth pulley 112 is fastened to the lower end of the shaft 110 within the interior of the base and in driving engagement with this pulley is a timing belt 114 and a similar tooth pulley 116 rotatably driven by an electric motor 118 which may be secured to the base 12 by any suitable means. The motor is preferably of the undirectional, constant-speed type and is provided with a conventional braking mechanism which will quickly retard rotation of the armature when the motor is de-energized. The motor serves to rotate the shaft 78 on its bearings 74, 76 for imparting reciprocating motion to the carriage 82 between its extreme positions of travel as shown in Figs. 5 and 6, respectively. In order to prevent rotation of the carriage 82 about the axis of the shaft 78 during rotation thereof, the carriage is provided with grooves 120 in the upper surfaces of both of the blocks 84, 86 for slidably receiving a rod 122 which extends above and parallel to the shaft 78 and is mounted at its ends to upper extensions 124 of the supports 70, 72.

Mounted on the outside face of the carriage plate 88 is a slide transfer device which is preferably stamped from sheet metal and comprises a slide transfer plate 126 having a pair of aligned slots 128 extending longitudinally of the plate 126, an angled pickup finger 130 depending downwardly from one end of the plate and carrying a slide pad 131 and a straight return finger 132 depending downwardly from the other end of the plate and carrying a pair of slide pads 133. Screws 134 which project freely through the slots 128 are threadedly secured to the plate 88 of the carriage 82 thus permitting limited and readily easy movement of the slide transfer device with respect to the carriage while at the same time maintaining a fairly rigid connection between these two elements.

At the left hand side and upper edge of the slide transfer plate, as viewed in Figs. 5 and 6, is a lug 136 which is bent back to project somewhat normal to the plate 88. The upper surface of the lug 136 is in a plane with the upper surface of an extension 138 of the block 84 and between the lug 136 and the extension 138 there is supported a double override mechanism generally indicated by the reference numeral 140. For a more full description of the override mechanism, attention is directed to Figs. 7 and 8 for the details of the mechanism and to Figs. 5 and 6 for its co-relation to the projector 10.

The mechanism 140 comprises a pair of similarly shaped supporting arms 142, 144 each of which has a slot 146, 146, respectively, at adjacent ends, with the arms arranged in superposed position so that the slots 146, 146 are somewhat aligned. A pair of flat U-shaped elements 148, 148 are retained in the slots with their bight portions 150, 150 bridging across the end edges of both of the slots and their respective leg portions closely overlying adjacent surfaces of the arms 142, 144. In this manner, with the elements 148, 148 in the positions shown in Fig. 8, the arms 142, 144 are loosely secured to each other. Each of the elements 148, 148 includes lip portions 152, 152 which extend laterally from the legs thereof. Spring retaining washers 154, 154 having cross-slots 156, 156 which are adapted to slidably confine the arms 142, 144 and the legs of the elements 148, 148, are mounted inwardly of the lip portions 152, 152 which secure the elements 148, 148 against outward displacement. The washers 154, 154 serve to constrain a coil spring 158 held therebetween, the spring being normally slightly compressed between the washers for holding the various parts of the override mechanism in the positions shown in Fig. 8. It will be immediately evident upon inspection of Fig. 8 that any outwardly or inwardly axial movement of the arms 142, 144 will compress the spring 158 thereby biasing the arms in the opposite direction to which an axial force is applied.

The remote ends of the arms are connected by screws 160, 160 to the lug 136 and the extension 138, respectively, and with this arrangement it will be apparent that relative movement in either direction between the carriage 82 and the slide transfer means or plate 126 will be opposed by the spring 158. Normally, the carriage and the slide transfer mechanism are spaced in the position as shown in Fig. 5 with the screws 134, 134 intermediate the ends of the slots 128, 128.

During leftward travel of the pickup and return mechanism 22, as viewed in Fig. 5, the pads 133 on return finger 132 are adapted to abut one edge 162 of a transparency A for returning the same back to its former position in the slide tray 58. However, in moving to the left and at the precise time the transparency A reaches its load position within the tray 58, the furthermost point 164 of the slide transfer means or plate 126 will engage a stop 166 on the extension 124. This engagement will prevent further leftward movement of the pickup and return plate 126. However, the carriage 82 is permitted to continue its movement by the override mechanism 140 and during this continuance of movement the cam 104 will reach the extreme end of the helix of the groove 80 or, in other words, the limit of the portion 105, and will be disposed for its trip in the reverse direction. After the cam 104 has made its turn and the carriage commences to travel to the right as viewed in Fig. 5, the motor 118 may continue to operate for permitting the finger 130 to pick up another transparency and move the same into projection position or the motor may be stopped at this point, such operation to be described hereinafter.

In the event the finger 130 is permitted to move a transparency into projection position, the pad 131 will engage the adjacent edge of the transparency A to push the latter to the position shown in Fig. 6. When in that position, which is the projection position, the other edge of the transparency will engage a stop 168 attached to the base 12 by any suitable means and thus terminate rightward travel of the slide transfer plate 126 and allow the carriage 82 to continue to the right under action of the override mechanism 140 until the cam 104 has turned through the extremity of the portion 105 and is disposed to return the transparency to the tray 58 as aforementioned.

In either extreme position of the slide transfer device, the further movement of the carriage will cause compression of the spring 158 whether the arms 142, 144 are extended or contracted. It will thus be seen that a two-directional override mechanism is provided, and this will permit the carriage 82 to reach its dead-end position of travel independently of movement of the slide transfer device and the positioning of the transparency A in the tray or in projection position. The purpose then of this arrangement of the pickup and return mechanism 22 is to provide quiet operation during transfer of the transparencies between load and projection positions and to eliminate the possibility of damage to the transparencies in the event one of them does not seat properly in the tray or becomes accidentally jammed in the tray or the structure adjacent its projection position. In addition, during normal operation, the override mechanism permits only the force of the coil spring 158 to encounter the edges of the transparencies thereby minimizing wear and tear of the slide transparency frame which is usually made of cardboard.

The carriage 82 carries an elongated cantilever spring 170 for movement therewith. The spring 170 is fastened to the carriage by a pair of screws 172 and is formed with a bent arm portion 174. Pivotally mounted on the upright 72 on the base 12 is a shutter 176 which is formed with a protruding extension 178 on one side thereof and to which a pivot pin 180 is fastened for pivotal engagement with the upright 72. The extension 178 is provided with a cam surface 182 upon which the arm portion 174 of the spring 170 is adapted to engage and slide along as the carriage approaches its extreme right dead-end position. As the carriage 82 travels from its position shown in Fig. 5 to the position in Fig. 6, the spring portion 174 will engage the cam surface 182 at a point slightly above the pivot 180 and thereby rotate the shutter 176 from its normal position shown in Fig. 5 upon further movement of the carriage. As will be understood by those skilled in the art, the shutter 176 is utilized to cover the projection aperture 36 during the time the transparency A is being moved into or out of projection position. In this manner, any movement of the transparency image on a projection screen is eliminated. In actual practice, the length of the spring 170 is so chosen as to impart rotation to the shutter after the transparency has come to a rest in its projection position and this is accomplished by the further movement of the carriage 82 after the slide transfer plate 126 reaches the extent of its travel as determined by the engagement of the transparency with the stop 168.

Between the projection aperture 36 and the shutter 176, there is suitably mounted on the base 12 a roller race comprising a plurality of, in this case four, V-groove rollers 184 arranged with the axes of the rollers parallel and in the same plane. Above the rollers 184 is a second race comprising V-groove rollers 186 similarly arranged. The distance between the ends of the V's of the rollers 184 and 186 is approximately the height of a single transparency frame. As shown in Fig. 2, the rollers 184, 186 are in alignment with the slot 56 of the magazine holder 48 and as will presently appear, with a transparency which is about to be moved into projection position. The axes of these rollers are arranged so that the bottom edge of the transparency A will slide from the plate 60 of the tray and onto the rollers 184 with relative ease. It will be appreciated that the movement of the transparency A between load and projection position is greatly facilitated in this manner since friction between the edges of transparency and the surrounding structure is minimized.

The construction of the slide tray 58 is best seen in Figs. 11-16 and is designed for holding a plurality of transparencies, say about forty, in parallel spaced relation to each other for sequential movement into and out of projection position. The slide tray may be manufactured from any suitable material such as resin, metal, etc., and by any process. As shown in the drawing, the tray 58 comprises the rectangular shaped lower support plate 60 which supports generally U-shaped dividers 190 in spaced relation for defining compartments 192 which are adapted to house transparencies therein. The underside of the plate 60 is provided with a rack 194 which cooperates with a drive pinion for moving the tray as will be described hereinafter.

End plates 196 are secured to and extend upwardly from the ends of the support plate 60 and across the tops of these end plates and the tops of the dividers 190 at one corner thereof, there is secured a relatively narrow index strip 198. Numerical designations 200 are suitably embossed on the strip 198 adjacent each compartment between the dividers 190 and these numerals serve to indicate each of the transparencies in the tray for indexing purposes. A narrow strip of material 202 is secured across the front of the tray 58 and is connected to the backs of each of the dividers 190 and to the end plates 196 at the lower portion of the edges thereof. The resulting frame for the tray 58 comprising the support plate 60, the dividers 190, the end plates 196, and the strips 198 and 202 offers a compact and rigid structure for supporting transparencies for purposes of loading in the projector 10 and for permanent storage elsewhere. It will also be noted that with the top strip 198 covering only a small area of the tray and the front strip covering approximately half of the front side, one corner of the tray for a substantial area is left free of supporting structure (see Fig. 1). The purpose for this unobstructed corner and top surface will best be understood when considering the movement of the carriage 82 and the finger 130 between load and projection positions. In Fig. 6, the curved depending finger 130 has moved to its extreme rightward position in order to move the transparency into projection position and in so doing, the pad 131 has just cleared the upper edge of the strip 202. The finger itself because of its association with the carriage 82 is moved through the tray and cuts the open corner and the upper surface thereof for a substantial distance terminating adjacent the strip 198. The front of the strip 202 includes a rack 204 which may be adapted to cooperate with a manually operable gear train (not shown) for moving the tray 58 in either direction within the holder.

As shown in Figs. 13, 15 and 16, the open ends of the U-shaped dividers are open to the rear of the tray 58 or to that side which faces the projection apparatus which comprises the light source 16 and the projection lens 18. This will enable unobstructed movement of a transparency A into and out of the tray 58. The lower ends of the compartments 192 between the dividers 190 are defined by a pair of angular fillets 206 which are adapted to contact and support the lower edges 208 of the frame of transparency A. As shown in Fig. 13, the lower edges of the compartments 192, near the entrance thereof, adjacent the open ends of the dividers 190, are flat and from this point and running along the lower ends of the compartments 192 toward the front strip 202, the fillets 206 taper upwardly reaching their greatest thickness near the front strip. The front ends of the compartments 192 adjacent the front strip 202 are provided with angular fillets 210 in the corners thereof and as will be seen in Fig. 13, the fillets 210 extend for only a short distance. The function of the fillets 206 is to direct and maintain each of the transparencies in a centered position within the compartments 192 during their movement into the tray 58 and storage therein so that the transparencies are equally spaced from one another. The fillets 210 serve to assist in positioning the transparencies in parallel relation with the dividers 190 and maintain them in this position. The fillets 206 and 210, in effect, present a means for holding the transparencies in equally spaced relationship at all times so that during continual actuation of the slide pickup and return mechanism 22, the pad 131 on finger 130 will be able to contact each of the transparencies squarely and without any danger of slipping between a transparency and a divider and lodging therebetween. In addition, each of the transparencies will be perfectly aligned with the grooves of the rollers 184, 186 thereby eliminating the danger of misdirecting a transparency into projection position.

The indexing mechanism for the present invention is best seen in Figs. 5, 6, 9 and 10. The lower rack 194 on the tray support plate 60 is engageable with an indexing and advancing pinion 212 secured on a shaft 214 which extends through and is pivotally mounted on the base 12. Means is provided for advancing the pinion 212 in a step-by-step rotative manner and to this end a unidirectional ratchet wheel 216 located within the base 12 is secured to the other end of the shaft 214 and is acted upon by an indexing mechanism generally indicated by the reference numeral 218.

The mechanism 218 includes an indexing bar 220 which is adapted to slide along the underside surface of the base 12 and is formed with an opening 222 located adjacent one end and a pair of elongated axially aligned slots 224, 226. A pair of flat headed screws 228 slidably secure the bar 220 to the base 12 and these screws projected through the slots 224, 226 in the manner shown in Fig. 9. The opening 222 accommodates one end of a thrust lever 230 which projects through the base 12 and extends vertically upwardly within the casing 14 wherein the lever is pivoted at 232 intermediate its ends to the support 70 of the casing. The uppermost end of the lever 230 carries a roller 234 which is engageable with a flat side 236 of the carriage 82 when the latter is approaching its extreme leftward position as viewed in Figs. 5 and 6. As the carriage 82 travels to the left and is engaged by the roller 234, the latter rides upwardly along the side 236 and the lever 230 rotates about the pivot 232 causing movement of the bar 220 to the right as viewed in Figs. 5, 6 and 9.

The bar 220 is also provided with a bracket 238 having a depending portion 240 secured to one side of the bar and a projecting portion 242 for pivotally supporting a pawl 244. The pawl 244 includes a tooth 246 which is engageable with the teeth 248 of the ratchet wheel 216 and is biased in a counterclockwise direction, as viewed in Fig. 9, by a bent wire spring 250 which is anchored on a stop 252 secured to the bar 220 and a projection 254 of the pawl 244. The stop 252 limits the extent of counterclockwise rotation of the pawl 244. A pin 256 secured to the base 12 extends through the slot 224 for a substantial distance and is engageable by the other end 258 of the pawl 244 for certain positions thereof. A coil spring 260 is held in tension between an anchor formed in the base adjacent one end of the bar 220 and a tongue formed on the other end of the bar and serves to bias the bar to the left as shown in Fig. 9 and consequently the wheel 234 on the lever 230 to the right as viewed in Fig. 6. To complete the indexing mechanism, a detent in the form of a wheel 262 is provided and is engageable with the teeth of the pinion 212. A suitable spring means (not shown) is utilized to bias the wheel 262 against the teeth of the pinion 212 thereby providing spring friction against the rotation thereof.

Normally, the parts of the indexing mechanism 218 are in the positions as shown in Figs. 6 and 9. As the lever 230 is rotated by the movement of the carriage 82 against the wheel 234, the index bar 220 will slide against the bias of the spring 260. Since the extension 254 of the pawl 244 is against the stop 252, counterclockwise rotation of the pawl 244 is prevented and, therefore, the pawl 244, its pivot, the end 258, and the tooth 246, move with the bar 220. In so moving, the tooth 246 will rotate the ratchet wheel 216 and consequently the advancing pinion 212 for advancing the tray 58. After engagement of the end 258 with the pin 256, further movement of the bar 220 will cause clockwise rotation of the pawl 244 thereby disengaging the tooth 246 from the ratchet 216 and terminating rotation of the pinion 212, as seen in Fig. 10. This latter step is insured by the provision of the wheel 262 which will be biased between two teeth of the pinion 212. Upon reversal of movement of the carriage 82, the lever will rotate back to its original position under the bias of the spring 260 which bias will also drive the bar 220 to the left carrying therewith the pawl 244 and its pivot. This counterclockwise rotation of the pawl by the spring 260 will result since the end 258 would have been moved away from the pin 256 during the reverse movement of the bar. Upon completion of the movement of the bar to the position shown in Fig. 9, the various parts of the indexing mechanism 218 are disposed for another indexing operation as aforesaid. It will be appreciated that the rotation of the ratchet wheel 216 during one of these indexing cycles is sufficient to move the tray 58 a distance equal to the distance between one compartment 192 in the tray 58 and the next succeeding spacing.

The electrical circuit and related structure for the projector 10 will now be described. The diagram of Fig. 17 illustrates the lamp 32, the motor 118, a fan motor 270, a selector switch 272, a timer circuit illustrated generally by the reference numeral 274, a relay 276 and a limit switch 278. The circuits for the various electrical components may be easily fabricated into a printed circuit with many of the components mounted on the circuit base, which may be conveniently mounted in back of the control panel 24.

Before proceeding further with the electrical system, it will be wise at this point to describe the limit switch 278 which is shown in Fig. 6 as well as in Fig. 17. The switch which may be mounted within the base 12, includes a switch element 280 in the form of an eccentric cam made of insulating material which is connected at the lower end of a rotatable shaft 282 mounted in the base 12 to the rear of the tray holder 20 and the lamp housing 30. As shown in Figs. 1, 2, 3 and 6, the shaft 282 is bent to overlie portions of the tray holder and the lamp housing and the end of the bent portion is adapted to engage a pair of limit stops 284, 286 adjustably mounted on either end of the carriage 82. Movement of the carriage 82 between its extreme position will cause rotation of the shaft 282 between the positions shown in Figs. 2 and 6, the purpose of which will be described presently.

The limit switch 278 includes two single-pole, double-throw switches having switch sections 288, 290 and 292, 294. Various leaf springs 296, 298, 300, 302, having a common anchor base 304 made of insulating material, are utilized for biasing the elements of the switches in definite controlling positions. The springs 296 and 302 serve as override springs for permitting override of the switches 288, 294, respectively, caused by any additional rotation of the element 280 after the switches have been closed. The springs 298 and 300 normally maintain the switches 290 and 292, respectively, in closed positions while at the same time holding the switches 288 and 294 open as shown in Fig. 17 when the carriage 82 is somewhere between its extreme end positions. When the carriage is moved to projection position, the element 280 will have rotated counterclockwise thereby forcing the switch 292 open and the switch 294 closed. In this case, the switch 290 is biased closed while the switch 288 is biased open. It will be obvious that the reverse of these switch positions will result when the element 280 is rotated clockwise to its other extreme position.

The springs also serve another important function with regard to the shaft 282 and the operation of the projector. The shaft 282 is mounted in the base 12, being free to rotate in either direction of its range of movement until the cam element 280 engages either of the springs 298, 300. Actually, there is provided a friction mechanism (not shown) for frictionally holding the shaft 282 in any position to which it is moved. When the shaft is forced to open either of the switches 290, 292, by the movement of the carriage 82, the two springs associated with the switch so opened will flex and create a bias against flexing. When the force has been removed, the springs under this flexing tension will rotate the shaft in order to restore the normal condition of the springs and the switches in their normal positions. Therefore, in actual practice, when the carriage 82 is not in either of its extreme positions to open either of the switches 290, 292, these switches will be closed.

The projector 10 and the included circuit is designed for semi-automatic and automatic operation and the selector switch 272 is designed for selectively conditioning the projector from the off position to either of these operations. A knob 306 for the switch 272 is utilized in cooperation with indicia 308 formed on the panel 24 and being indicative of the "off," "load," "semi-automatic" and "automatic" positions of the switch 272 for facilitating desired operation of the projector. The switch 272 includes an insulating shaft 310 which is rotatable with the knob 306 and to which a pair of oppositely extending conductor bars 312, 314 are connected for rotation therewith. A sector conductor 316 is mounted in the switch 272 and is connected by a conductor 318 to the ground side $L_1$ of a source $L_1$, $L_2$ of ordinary house alternating current of 115 volts at 60 cycles. A similar sector conductor 320 is mounted in the switch 272 and is connected by a conductor 322 to a terminal 324 on the relay 276. When the knob 306 is rotated from the "off" position, or from that position shown in Fig. 17, the conductor bars 312, 314 are moved across the sectors 316, 320, respectively, and will remain in engagement therewith for all other controlling positions of the knob 306.

The lamp 32 and the fan motor 270 are connected in parallel across the source $L_1$, $L_2$ when a "start" switch 326 which has one terminal connected to the hot side $L_2$ of the source is closed. Preferably, the switch 326 is mechanically connected to the switch 272 so that upon movement of the knob 306 from its "off" position to any of the other positions, the switch 326 will close and remain closed. To complete the structure of the switch 272, three pairs of diametrically opposed contacts 328, 328; 330, 330 and 332, 332 are included and arranged so that the conductor bars 312, 314 may be rotated to bridge across only one pair of contacts. The contacts 328, 328 are utilized to place the apparatus in "load" operation, the contacts 330, 330 for "semi-automatic" operation and the contacts 332, 332 for "automatic" operation.

Operation

The remaining portions of the electrical system will be taken up in the course of describing the operation of the projector which now follows.

For semi-automatic operation, the selector switch 272 is rotated to the "load" position to place the conductor bars 312, 314 across the contacts 328, 328, respectively. In the event the cam element 280 is initially somewhere in mid-position, as shown in Fig. 17, the motor 118 will become energized for moving the carriage toward the load position. The circuit for this operation is as follows: source $L_1$, conductors 318, 334, 336, spring 300, switch 292, conductors 338, 340, spring 298, switch 290, conductor 342, motor 118, conductors 344, 346, 348, switch 326 and source $L_2$. As the carriage 82 moves toward "load" position and just before reaching this position, the end of the shaft 282 will engage the stop 284 (see Fig. 2) and be moved thereby, and, as the carriage approaches its position for reversal of direction, the shaft 282 will have rotated the cam element 280 clockwise, as viewed in Fig. 17, to open the switch 290 to the motor 118 and close the switch 288. Upon this occurrence, the motor 118 will cease operating with the carriage 82 in a position for picking up a slide. The abutment of the edge of the slide transfer plate 126 with the stop 166 will take place at about the same time the motor 118 is de-energized and any overtravel of the motor will be taken out by the continued movement of the carriage 82 to its reverse-direction position.

The selector switch 272 is next rotated to the "semi-automatic" position to place the conductor bars 312, 314 across the contacts 330, 330, respectively. As indicated above, the cam element is in its uppermost position for actuating the switch 290 to its open position and the switch 288 into its closed position. With the conductor bars in the "semi-automatic" position, the motor 118 will be energized and the carriage 82 will move from the load position, as occuped in Fig. 5, to the projection position, as occuped in Fig. 6 and will carry a transparency therewith. The circuit for this operation is as follows: $L_1$, conductors 318, 334, 336, spring 300, switch 292, conductors 338, 352, terminal 324, conductor 322, sector 320, conductor bar 314, contact 330, conductors 350, 342, motor 118, conductors 344, 346, 348, switch 326 and $L_2$. As the carriage moves, the stop 284 will become disengaged from the shaft 282 thus permitting rotation thereof and counterclockwise rotation of the element 280 under the bias of the springs 300, 302, until the latter are unflexed and in their normal positions as shown in Fig. 17. With the springs 300, 302 in these positions, the switch 290 is closed and the motor 118 continues to operate for moving the carriage to the position occupied in Fig. 6. The circuit for this operation is as follows: $L_1$, conductors 318, 334, 336, spring 300, switch 292, conductors 338, 340, spring 298, switch 290, conductor 342, motor 118, conductors 344, 346, 348, switch 326 and $L_1$. As the carriage 82 is moving, the arm 174 of the spring 170 will engage surface 182, the abutment 178 for rotating the shutter 176 upwardly as the transparency is brought into projection position.

When the carriage 82 is moved into projection position, the stop 286 will engage the end of the shaft 282 and rotate the cam element 280 in a counterclockwise direction to open the switch 292 thereby terminating operation of the motor 118. The abutment of the edge of the transparency A against the stop 168 will take place at about the time the motor 118 is de-energized and any overtravel of the motor will be taken out by the continued movement of the carriage 82 to its reverse-direction position. The apparatus is now in condition for semi-automatic projection of each of the transparencies in the tray 58. Further operation of the projector whereby each of the transparencies may be moved from the projection position into the tray and another moved into projection position may be accomplished by a manually actuated switch or push button on the projector itself or on the end of an extension cord if remote control is desired. The switch, designated by the reference numeral 354, is preferably of the normally-open type and is included in a circuit which indirectly momentarily by-passes the limit switch 292 when it is opened as will presently appear. A two-conductor cord 356 leading to a remote switch 358 may be connected across the switch 354 in the event remote actuation of the switch 354 is desired.

Upon inspection of Fig. 17, it is noted that carriage motor 118 is de-energized when the cam element 280 is actuated so that the switch 292 is forced open and the switch 294 closed. It will also be noted that with the switch 294 in closed position there is a closed circuit for the relay coil of the relay 272 traced as follows: $L_2$, conductors 348, 346, conductor 360 which has connected therein a rectifier 362 and a resistor 364, conductor 366 which has connected therein two resistors 368, 370, relay coil 372 of the relay 276, conductor 374, spring 302, switch 294, spring 300, conductors 336, 334 to $L_1$. The relay 276 includes a pair of stationary contacts 376, 378 and a movable switch arm 280 normally biased against the contact 376 which is connected through a resistor 382 by a conductor 384 to a point between the resistors 368, 370. The contact 378 is connected to the conductors 322, 352 and the switch arm 380 is connected to the conductors 334, 336. The conductor 384 serves to divide out a portion of the current flowing from the rectifier 362 to the relay 276 and permits this portion of the current to bleed through the switch arm 380 to the ground side $L_1$ of the electric supply source. Generally, relays of this type require a larger current input to the coil in order to "pull in" the switch arm than is required to hold or prevent "dropping out" of the switch arm from its actuated position. This feature is utilized in the present invention and accordingly the resistances offered by the resistors 368, 370 and 382 are sufficient to permit current to flow in the coil 372, however, the value of the current is preferably held to a point just below that required to "pull in" the switch arm 380. If the engagement of the switch arm 380 and the contact 376 is "cracked," the effect of the conductor 384 and the resistor 382 upon the relay will be eliminated and the current flowing through the resistors 368, 370 to the coil 372 is sufficient to move the switch arm 380 into engagement with the contact 378 and to hold this engagement even after the current in the coil 372 has decreased somewhat.

The switch 354 is connected across the resistors 368, 370 by conductors 386, 388 and has in series therewith a resistor 390 which, when the switch 354 is closed, is placed in parallel with the resistors 368, 370. Upon this occurrence, the coil 372 will receive additional current from the rectifier 362 and this current will be sufficient, when added to that flowing by way of the resistors 368, 370, to "crack" the switch arm 380 from the contact 376 and thereby eliminate the bleeding of current through the conductor 384. Since the current entering the conductor 384 is no longer dissipating, the same is, in effect, being added to the current flowing through the resistors 368, 370, which current will be sufficient for actuating the switch arm 380 into engagement with the contact 378, and permit energization of the motor 118. The circuit for this operation is as follows: $L_1$, conductors 318, 334, switch arm 380, contact 378, conductor 322, sector 320, conductor bar 314, contact 330, conductor 350, motor 118, conductors 344, 346, 348, switch 326 and to $L_2$. As the carriage starts to move, the arm 174 of the spring 170 is released from its engagement with the abutment 178 of the shutter 176, permitting lowering of the same under the force of gravity.

The spacing of the fingers 130 and 132 on the slide transfer plate 126 as compared with the width of a standard transparency slide is such as to permit slight movement of the carriage 82 and lowering of the shutter 176 before the transparency is moved. In this way, the shutter is allowed to cover and uncover a transparency while the same is in a fixed position thereby eliminating the projection on the screen of such movement of a transparency.

As the carriage starts to move from the projection position, the shaft 282 will rotate slightly or enough for the element 280 to assume a position so that the switch 292 will close and the switch 294 open under the bias of the springs 300, 302. However, energization of the motor 118 will continue through a circuit traced as follows: $L_1$, conductors 318, 334, 336, spring 300, switch 292, conductors 338, 346, spring 298, switch 290, conductor 342, motor 118, conductors 334, 346, 348, switch 326 and to $L_2$. Actually, in this operation the switch 354 need only be closed for a short period of time, such as the time it takes to depress a push button and to immediately release the same. In closing the switch 354, the closing of the switch arm 380 upon the contact 378 as previously described will be instantaneous and the current flowing to the coil 372 by way of the resistors 368, 370 will be more than enough to maintain this engagement until the carriage 82 moves to open the switch 294.

Upon nearing extreme load position and after the finger 130 has cleared the tray 58, as shown in Fig. 5, the roller 234 will engage the surface of the carriage 82 and be moved thereby for setting the indexing mechanism 218 as aforesaid, for advancing the tray 58 a distance equal to the distance between the center lines of adjacent spaces 192 in the tray 58. Simultaneously with this operation, the stop 284 will rotate the shaft 282 and the cam element 280 in a clockwise direction, as viewed in Fig. 17, thereby opening the switch 290. The motor 118 will continue to operate through a circuit outlined above and the slide mechanism 22 will pick up a transparency and transfer the same to its projection position. As pointed out above, the motor 118 will be de-energized when the carriage 82 reaches the projection position since the cam element 280 will have been rotated to open the switch 292. After viewing the transparency now in projection position, the operator may simply close the switch 354 to bring another transparency into view by a repeat of the operation outlined above.

For "automatic" operation of the projector use is made of the timing circuit 274 and the relay circuit 276. The timing circuit comprises a charging capacitor 392 connected on one side by a conductor 394 to the conductor 334 and on the other side to one end of a variable resistor 396 which in turn is connected at its other end to a resistor 398 and by a conductor 400 to the conductor 360.

A glow tube 402 is connected by a conductor 404 to the conductor 366 between the resistor 370 and the coil 372 of the relay 276 and to the conductor 400 between the variable resistor 396 and the capacitor 392. The glow tube is designed to block the flow of current from the charging capacitor 392 to the coil 372 until the voltage across the glow tube 402 is of a predetermined value, and for the particular values of the components used in the circuit, the predetermined voltage of approximately 90 volts, derived from the rectifier 362 and the capacitor 392, is utilized to trigger the conduction through the glow tube and permit the discharge of current, stored in the capacitor 392, to reach the coil 372. This discharged current although of short duration will be sufficient for energizing the coil 372 to "crack" the engagement of the switch arm 380 with the contact 376 in order to eliminate the bleeding effect of the conductor 384 and to move the switch arm 380 against the contact 378. The pulse then, from the capacitor 392 and the glow tube 402, need only be large enough to "crack" the contact 376 since the bias on the coil 372 derived through the resistors 368, 370, as aforesaid, is slightly below that required to "pull in" the switch arm 380. Because of this normal bias and the smallness of the pulse required to trigger the actuation of the relay 276, the need for a power vacuum tube is eliminated and the size and cost of the capacitor 392 is greatly minimized.

The variable resistor 396 is utilized to control the time required for charging of the capacitor 392 and may have its adjusting shaft 406 connected to a siutable knob 408 on the panel 24 for cooperation with a seconds time interval scale 410 imprinted thereon. The resistor 396 will then control the time necessary to charge the capacitor 392 to the required voltage for firing the glow tube and permit conduction therethrough. For purposes of the present invention, the resistance adjustment of the resistor 396 has been calibrated in seconds of time so that a period of time may be selected by rotating the knob 408 in cooperation with the scale 410 for presetting the duration between successive energizations of the coil 372 and consequently the closing of the contact 378 by the switch arm 380.

To complete the circuit of the projector, a filter capacitor 412 for smoothing the output of the rectifier is connected between the output terminal of the rectifier 362 and the source L₁ and a conductor 414 is connected between the contacts 328, 330, which are associated with the conductor bar 312 and the side of capacitor 392 connected to the glow tube 402. A conductor 416 is also connected between this side of the capacitor 392 and the spring 296 for the switch 288. The purpose of the conductor 414 is to prevent the charge from being built up in the capacitor 392 during "load" and "semi-automatic" operation and the purpose of the conductor 416 is to dissipate this charge during "automatic" operation when the switch 288 is closed.

With the selector switch in "automatic" position and the carriage 82 in projection position, the cam element will be in a position to open the switch 292 and close the switch 294, thereby preventing operation of the motor 118.

With the carriage 82 in projection position, energization of the motor is effected by means of the capacitor 392 which, when the conductor bar 312 is moved from the contact 330 and the switch 288 is open and for subsequent cycles of automatic operation, must discharge through the glow tube 402, and the instantaneous current so discharged when added to the direct current flowing from the rectifier 362 through the resistors 396, 398 will be sufficient to "crack" the switch arm 380 from the contact 386. As was the case with the closing of the switch 354 for semi-automatic operation, once the contact 376 is "cracked," the bleed circuit 382, 384 is opened and the normal bias in the conductor 366 will be sufficient to energize the coil 372 for actuating the switch arm 380 onto the contact 378. With the switch arm in this position, the motor 118 will be energized. The circuit to the motor is as follows: source L₁, conductor 334, switch arm 380, contact 378, terminal 324, conductor 322, sector 320, conductor bar 314, contact 332, conductor 350, motor 118, conductors 344, 346, 348, switch 326 and to source L₂.

As noted above, as soon as the carriage 82 leaves projection position, the cam element 280 will rotate to close the switch 292 to sustain operation of the motor. When the carriage reaches load position and the cam element 280 is moved to open the switch 290, energization of the motor will continue through the switch 292 as follows: source L₁, conductors 334, 336, spring 300 switch 292, conductors 338, 352, terminal 324, conductor 322, sector 320, conductor bar 314, contact 332, conductor 350, motor 118, conductors 344, 346, 348, switch 326 and to source L₁. During this step of the operation, with the switch 288 momentarily closed, all of the charge remaining in the capacitor 392 is discharged as aforesaid through a circuit as follows: one side of capacitor 392, conductors 414, 416, spring 296, switch 288, spring 298, conductors 340, 338, switch 292, spring 300, conductors 336, 334 back to the other side of the capacitor 392. In this manner, the charging of the capacitor 392 may be more easily controlled for the next cycle of operation since a charge is not permitted to accumulate in the capacitor and thus the time sequences for the projection of each transparency will be uniform.

The operation of the projector will continue as long as the selector switch is in "automatic" position by means of the circuits outlined above. When a slide is moved to projection position, the motor 118 will be de-energized momentarily until the capacitor 392 is charged in accordance with the time setting of the knob 408, which setting would be determined by the time desired for viewing the projected slide. When the capacitor 392 discharges, the tube 402 will conduct to permit energization of the relay coil 372 for the eventual energization of the motor 118 and recycling of the operation. As the carriage 82 moves a slide into and out of projection position, the shutter 176 will be raised and lowered accordingly. When moved into load position, the carriage will actuate the indexing mechanism 218 for advancing the tray 58 to ready the same for another withdrawal of a slide.

In order to attain the various sequences of operation detailed in the foregoing, the following exemplary values of the various components were utilized. It will be understood that these values are illustrative only and in no way are to be considered in a limiting sense:

Motor 118 _____ 115 volts, 1/115 H.P., 2800 r.p.m.
Rectifier 362 _____ Selenium, 20 ma., half wave.
Resistor 364 _____ 100 ohms.
Resistor 368 _____ 12,000 ohms, 1 watt.
Resistor 370 _____ 12,000 ohms, 1 watt.
Resistor 390 _____ 27,000 ohms.
Resistor 396 _____ Variable to max. 10 megohms.
Resistor 398 _____ 470,000 ohms.
Resistor 382 _____ 15,000 ohms.
Capacitor 392 _____ 4 mfd., 450 volts.
Capacitor 412 _____ 1 mfd., 150 volts.

From the foregoing description, it will be appreciated that the present invention provides a unified and compact structure which is adapted to receive a slide tray carrying a relatively large number of transparencies and individually remove each of the transparencies from the slide tray, project the transparency, return it to its former position in the tray and advance the tray for another cycle of projection. It will also be appreciated that this cycle of operation may be performed semi-automatically or automatically. While there is in the application specifically described one form which the invention may assume in practice, it will be understood that this form is shown for purpose of illustration, and that the same may be modified and embodied in various other forms or employed in other uses without departing from its spirit or the scope of the appended claims.

In the copending application, Serial No. 640,905, filed February 18, 1957, and referred to above, there is illustrated and described the identical electrical system as described herein. No claim is made herein to the electrical system and to the features thereof as these features are claimed in the above referred to copending application. Only those features which pertain to the mechanical arrangement of the various structural parts disclosed herein are claimed in the present application.

We claim:

1. A slide changing apparatus for a slide projector having a slide tray for storing a plurality of slides in parallel side by side positions, a light source, and an aligned lens means defining a projection position, said apparatus comprising, a movable carriage, a transfer device slidably mounted on said carriage for moving a slide out of the tray and into said projection position and back into the tray, a drive shaft on said apparatus for supporting and imparting movement to said carriage between a slide pickup position adjacent the tray and said projection position, an override mechanism connected between said carriage and said transfer device for permitting continued movement of the carriage after said transfer device has moved a slide into the tray, said override means comprising a pair of slidably disposed arms respectively connected at the opposite ends thereof with said transfer device and carriage and interconnected at the adjacent ends thereof through the intermediary of a compression spring for enabling overtravel of said carriage in either direction relative to said transfer device, an indexing mechanism for advancing the tray after said transfer device has moved a slide into the tray and during continued movement of said carriage, a driving motor for driving said drive shaft unidirectionally, and means operatively connecting said drive shaft and said carriage for reciprocating said carriage in response to unidirectional rotation of said drive shaft.

2. A slide changing apparatus for a slide projector having a slide tray for storing a plurality of slides in parallel side by side positions, a light source, and an aligned optical system defining a projection position, said apparatus comprising, a movable carriage, a transfer device slidably mounted on said carriage and movable to a pickup position for moving a slide out of the tray and into said projection position and back to said pickup position, override means for permitting continued movement of said carriage with respect to said transfer device when the latter has moved to either said pickup or projection positions, said override means comprising a pair of slidably disposed arms respectively connected at the opposite ends thereof with said transfer device and carriage and interconnected at the adjacent ends thereof through the intermediary of a compression spring for enabling overtravel of said carriage in either direction relative to said transfer device, a drive shaft on said apparatus for supporting and imparting movement to said carriage between said pickup and said projection positions, a driving motor for rotating said drive shaft unidirectionally, and means operatively connecting said drive shaft and said carriage for reciprocating said carriage in response to unidirectional rotation of said drive shaft.

3. A slide changing apparatus for a slide projector having a slide tray for storing a plurality of slides in parallel side by side positions, a light source, and an aligned optical system defining a projection position, said apparatus comprising, a movable carriage, a transfer device slidably mounted on said carriage and movable to a pickup position for moving a slide out of the tray and said projection position and back to said pickup position, override means for permitting continued movement of said carriage with respect to said transfer device when the latter has stopped in either said pickup or projection positions, said override means comprising a pair of slidably disposed arms respectively connected at the opposite ends thereof with said transfer device and carriage and interconnected at the adjacent ends thereof through the intermediary of a compression spring for enabling overtravel of said carriage in either direction relative to said transfer device, indexing mechanism for advancing the tray after said transfer device has stopped in said pickup position and during continued movement of said carriage, a drive shaft on said apparatus for supporting and imparting movement to said carriage between said pickup and said projection positions, and means operatively connecting said drive shaft and said carriage for reciprocating said carriage in response to unidirectional rotation of said drive shaft.

4. A slide changing apparatus for a slide projector having a slide tray for storing a plurality of slides in parallel side by side positions, a light source, and an aligned optical system defining a projection position, said apparatus comprising, a movable carriage, a transfer device slidably mounted on said carriage and movable to a pickup position for moving a slide out of the tray and into said projection position and back to said pickup position, override means for permitting continued movement of said carriage with respect to said transfer device when the latter has stopped in either said pickup or projection positions, said override means comprising a pair of slidably disposed arms respectively connected at the opposite ends thereof with said transfer device and carriage and interconnected at the adjacent ends thereof through the intermediary of a compression spring for enabling overtravel of said carriage in either direction relative to said transfer device, indexing mechanism for advancing the tray after said transfer device has stopped in said pickup position and during continued movement of said carriage, a drive shaft on said apparatus for supporting and imparting movement to said carriage between said pickup and said projection positions, motor means for rotating said drive shaft unidirectionally, said drive shaft having formed on the periphery thereof a reverse helical groove, and means carried by said carriage in engagement with said groove for imparting reciprocatory movement to said carriage between said positions in response to unidirectional rotation of said drive shaft.

5. A slide changing apparatus for a slide projector having a slide tray for storing a plurality of slides in parallel side by side positions, a light source, and an aligned optical system defining a projection position, said apparatus comprising, a movable carriage, a transfer device slidably mounted on said carriage and movable to a pickup position for moving a slide out of the tray and into said projection position and back to said pickup position, override means for permitting continued movement of said carriage with respect to said transfer device when the latter has stopped in either said pickup or projection positions, said override means comprising a pair of slidably disposed arms respectively connected at the opposite ends thereof with said transfer device and carriage and interconnected at the adjacent ends thereof through the intermediately of a compression spring for enabling overtravel of said carriage in either direction relative ot said transfer device, indexing mechanism for advancing the tray upon actuation thereof, a lever pivotally mounted on the slide projector and adapted to actuate said indexing mechanism upon rotation of said lever, said lever having a roller on one end thereof engagable with said carriage, said carriage being constructed and arranged to rotate said lever for actuating said indexing mechanism to advance the tray after said transfer device has stopped in said pickup position and during continued movement of said carriage, a drive shaft on said apparatus for supporting and imparting movement to said carriage between said pickup and said projection positions, and means operatively connecting said drive shaft and said carriage for reciprocating said carriage in response to unidirectional rotation of said drive shaft.

6. In a slide projector the combination comprising a slide tray for storing a plurality of slides in parallel side by side positions, a light source, an aligned optical system defining a projection position, a slide changing apparatus including a movable carriage, a transfer device slidably mounted on said carriage and movable to a pickup position for moving a slide out of the tray and into said projection position and back to said pickup position, override means for permitting continued movement of said carriage with respect to said transfer device when the latter has stopped in either said pickup or projection positions, said override means comprising a pair of slidably disposed arms respectively connected at the opposite ends thereof with said transfer device and carriage and interconnected at the adjacent ends thereof through the intermediary of a compression spring for enabling overtravel of said carriage in either direction relative to said transfer device, indexing mechanism for advancing the tray upon actuation thereof, means for actuating said indexing mechanism after said transfer mechanism has stopped in said pickup position and during continued movement of said carriage, a shutter pivotally carried by said projector and being normally positioned for intercepting the light beam from said source, said carriage being constructed and arranged to engage said shutter during continued movement of said carriage for moving the shutter out of the light beam after said transfer device is moved into said projection position, a drive shaft on said apparatus for supporting and imparting movement to said carriage between said pickup and said projection positions, and means operatively connecting said drive shaft and said carriage for reciprocating said carriage in response to unidirectional rotation of said drive shaft.

7. In a slide projector the combination comprising a slide tray for storing a plurality of slides in parallel side by side positions, a light source, an aligned optical system defining a projection position, a slide changing apparatus including a movable carriage, a transfer device slidably mounted on said carriage and movable to a pickup position for moving a slide out of the tray and into projection position with respect to the projecting means and back to said pickup position, override means for permitting continued movement of said carriage with respect to said transfer device when the latter has stopped in either said pickup or projection positions, said override means comprising a pair of slidably disposed arms respectively connected at the opposite ends thereof with said transfer device and carriage and interconnected at the adjacent ends thereof through the intermediary of a compression spring for enabling overtravel of said carriage in either direction relative to said transfer device, indexing mechanism for advancing the tray upon actuation thereof, means for actuating said indexing mechanism after said transfer device has stopped in said pickup position and during continued movement of said carriage, a shutter pivotally carried by said projector and being normally positioned for intercepting the light beam from said source, said carriage being constructed and arranged to engage said shutter during continued movement of said carriage for moving the latter out of the light beam after said transfer device is moved into said projection position, a drive shaft on said apparatus for supporting and imparting movement to said carriage between said pickup and said projection positions, motor means for rotating said drive shaft unidirectionally, said drive shaft having formed on the periphery thereof a reverse helical groove, and means carried by said carriage in engagement with said groove for imparting reciprocatory movement to said carriage between said positions in response to unidirectional rotation of said drive shaft.

References Cited in the file of this patent

UNITED STATES PATENTS

| | | |
|---|---|---|
| 775,963 | Bentzon | Nov. 29, 1904 |
| 1,711,528 | Gurevich et al. | May 7, 1929 |
| 2,590,492 | Bennett et al. | Mar. 25, 1952 |
| 2,732,758 | Waller | Jan. 31, 1956 |
| 2,774,472 | Badalich | Dec. 18, 1956 |
| 2,833,179 | Richards | May 6, 1958 |
| 2,878,719 | Lutes | Mar. 24, 1959 |

UNITED STATES PATENT OFFICE

CERTIFICATE OF CORRECTION

Patent No. 2,949,814                  August 23, 1960

Olin W. Boughton et al.

It is hereby certified that error appears in the printed specification of the above numbered patent requiring correction and that the said Letters Patent should read as corrected below.

Column 16, line 70, for "intermediately" read -- intermediary --; line 72, for "ot" read -- to --.

Signed and sealed this 4th day of April 1961.

(SEAL)
Attest: ERNEST W. SWIDER

Attesting Officer

ARTHUR W. CROCKER
Acting Commissioner of Patents